B. D. BISHOP.
SUPPLEMENTAL SPRING FOR AUTOMOBILES.
APPLICATION FILED AUG. 31, 1908.

956,033.

Patented Apr. 26, 1910.

Witnesses.
C. H. Garnett
J. Murphy

Inventor.
Brenton D. Bishop
by Jas. H. Churchill
atty.

UNITED STATES PATENT OFFICE.

BRENTON D. BISHOP, OF BOSTON, MASSACHUSETTS.

SUPPLEMENTAL SPRING FOR AUTOMOBILES.

956,033.  Specification of Letters Patent.  Patented Apr. 26, 1910.

Application filed August 31, 1908. Serial No. 450,954.

*To all whom it may concern:*

Be it known that I, BRENTON D. BISHOP, a citizen of the United States, residing in Boston, county of Suffolk, and State of Massachusetts, have invented an Improvement in Supplemental Springs for Automobiles, of which the following description, in connection with the accompanying drawings, is a specification, like letters on the drawings representing like parts.

This invention relates to a supplemental spring for use on automobiles as auxiliary to the body supporting springs of the vehicle, and has for its object to provide a simple, inexpensive spring, which can be applied in a minimum time and with the least possible labor.

The supplemental spring is constructed as will be described so as to enable it to be used instead of the usual links, which connect one end of the leaf spring to the chassis. For this purpose, the supplemental spring is composed of a plurality of convolutions having their ends extended in the same direction to form arms which are bent at their ends in the plane of said arms to form eyes for the reception of bolts, one of said arms being offset or bent so that its eye is brought in the same vertical plane as the eye of the other arm. These and other features of this invention will be pointed out in the claims at the end of this specification.

Figure 1:
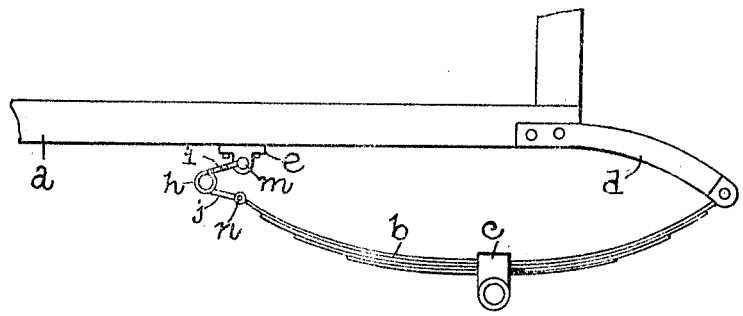
Figure 2:
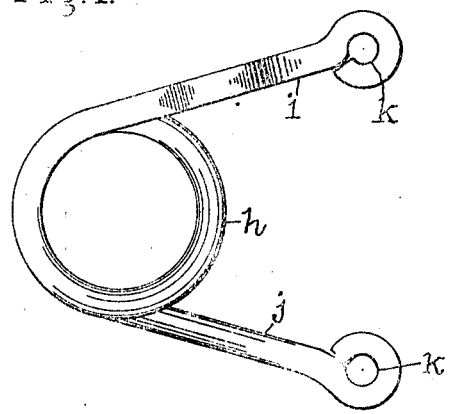
Figure 3:
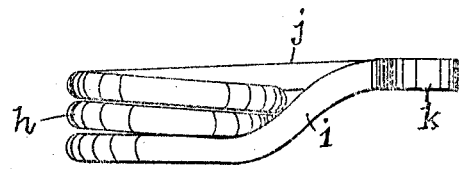

Figure 1 is a side elevation of a portion of a chassis provided with a leaf spring which is connected at one end to the chassis by supplemental springs embodying this invention. Fig. 2 is a side elevation on an enlarged scale of the supplemental spring shown in Fig. 1, and Fig. 3, a plan view of the supplemental spring shown in Fig. 1.

Referring to the drawing, *a* represents a side bar of the chassis of a motor vehicle or automobile, and *b*, a leaf spring, which supports the same upon an axle, not shown, to which the leaf spring is secured by the clip *c*.

The leaf spring *b* is connected at one end to an arm *d* attached to the chassis, and usually the other end is connected by links to the hanger or bracket *e* fastened to the side bar *a*.

The present invention has for its object to provide a supplemental spring which can be used as a substitute for the links referred to, and which not only increases the spring support for the chassis *a* and the body of the car secured to it, but also acts as a shock absorber and reduces to a minimum the liability of the main or leaf springs being broken when the car is driven over rough places in the road and especially at moderately high speed.

The supplemental spring referred to consists of a coil wire spring having a plurality of convolutions *h* set substantially close together and having their ends extended in the same direction to form arms *i*, *j*, which are bent at their ends to form eyes *k*. One of the arms *i*, *j*, is offset or bent toward the other so that its eye *k* lies substantially in a vertical plane passing through the other eye as clearly represented in Fig. 3, which enables the supplemental springs to be substituted for the straight links now commonly used on opposite sides of the hanger or bracket *e* for fastening the main or leaf spring *b* to the chassis *a*. The supplemental springs can be connected with the opposite sides of the hanger *e* and of the leaf spring by the same bolts *m*, *n*, now used to connect the links to the hanger and leaf spring. Furthermore the supplemental springs can be used with their coils within or without the leaf spring, thereby enabling the said supplemental springs to be attached without interfering with other parts of the car.

By reference to Fig. 1, it will be seen that additional spring action is provided, and also that the additional spring acts as a shock absorber, for as the leaf spring is moved upward toward the car, the arms *i*, *j*, in the spring hereinshown are brought toward each other and this movement is resisted by the winding up of the coils, whereas when the car rebounds, this latter movement tends to unwind the coils and is resisted thereby.

The supplemental spring hereinshown is provided with diverging arms and may be termed a compressing form of spring, but I do not desire to limit the invention in this respect, as the arms *i*, *j*, may be normally close together and expanded by the action of the car, which latter form of spring may be termed an expansion spring.

It will be observed that the eyes *k* are formed by bending the ends of the arms *i*, *j*, in the direction of their length so that the axes of said eyes are substantially parallel with the axis of the coil *h*, and as a result the supplemental spring can be used as a substitute for the usual links employed to connect the leaf spring with the frame of the vehicle, and the spring action desired can be obtained with a wire of small diameter at the least possible cost.

Claims.

1. The combination with a motor vehicle provided with leaf supporting springs, of supplemental springs each comprising a coil having arms extended in the same direction and bent at their ends in the plane of said arms to form eyes having their axes parallel with the axis of the said coil, and bolts passing through said eyes to connect the leaf spring with the framework of said vehicle.

2. The combination with a motor vehicle provided with leaf supporting springs, of supplemental springs having coils provided at their opposite ends with arms extended from them and bent at their ends in the plane of said arms to form eyes having their axes parallel with the axes of the coils, said supplemental springs being interposed between the leaf spring and the framework of the vehicle with the axes of the coils arranged transversely of the leaf springs, and means engaging said eyes out of line with the said coils to attach the supplemental springs to the leaf springs and to the frame of the vehicle, substantially as described.

3. A supplemental spring for motor vehicles, comprising a coil having a plurality of convolutions and arms extended from the endmost convolutions and provided with eyes having their axes parallel with the axis of said coil, one of said arms being bent or offset over the coil toward the other of said arms to bring the eyes of both arms into substantially the same plane, substantially as described.

In testimony whereof, I have signed my name to this specification in the presence of two subscribing witnesses.

BRENTON D. BISHOP.

Witnesses:
JAS. H. CHURCHILL,
J. MURPHY.